(12) United States Patent
Leoncini et al.

(10) Patent No.: US 9,796,017 B2
(45) Date of Patent: Oct. 24, 2017

(54) ROLL FOR HANDLING A LOAD IN A FURNACE USABLE IN A CONTINUOUS CASTING AND ROLLING PROCESS FOR THIN CARBON STEEL SLABS

(71) Applicants: Danieli & C. Officine Meccaniche S.p.A., Buttrio (IT); Danieli Centro Combustion S.p.A., Cinisello Balsamo (IT)

(72) Inventors: Claudio Leoncini, Genoa (IT); Matteo Mazza, Genoa (IT); Mirco Pedemonte, Genoa (IT)

(73) Assignees: Danieli & C. Officine Meccaniche S.P.A., Buttrio (IT); Danieli Centro Combustion S.P.A., Cinisello Balsamo (IT)

( * ) Notice: Subject to any disclaimer, the term of this patent is extended or adjusted under 35 U.S.C. 154(b) by 0 days.

(21) Appl. No.: 15/310,723

(22) PCT Filed: May 27, 2015

(86) PCT No.: PCT/IB2015/053962
§ 371 (c)(1),
(2) Date: Nov. 11, 2016

(87) PCT Pub. No.: WO2015/181736
PCT Pub. Date: Dec. 3, 2015

(65) Prior Publication Data
US 2017/0080486 A1   Mar. 23, 2017

(30) Foreign Application Priority Data
May 27, 2014 (IT) .............................. MI2014A0971

(51) Int. Cl.
*B22D 11/124* (2006.01)
*B22D 11/128* (2006.01)
(Continued)

(52) U.S. Cl.
CPC ........ *B22D 11/1245* (2013.01); *C03B 35/181* (2013.01); *C03B 35/184* (2013.01);
(Continued)

(58) Field of Classification Search
CPC ............. B22D 11/1245; B22D 11/1287; F27B 9/2407; F27D 3/026
(Continued)

(56) References Cited

U.S. PATENT DOCUMENTS 3,882,923 A * 5/1975 Alberny ............... B22D 11/122
164/442
4,538,668 A * 9/1985 Nishihara ............... B21B 27/00
164/442
(Continued)

FOREIGN PATENT DOCUMENTS

JP         59218249 A  * 12/1984  ......... B22D 11/1287
WO        WO0234026     5/2002

*Primary Examiner* — Kevin E Yoon
(74) *Attorney, Agent, or Firm* — Stetina Brunda Garred & Brucker

(57) ABSTRACT

The present invention relates to a water-cooled handling roll (100) for handling a load (50), in particular a thin slab, in a furnace for temperature heating, maintaining and for buffering, arranged between casting and roughing, in a continuous casting and rolling process for thin carbon steel slabs. The roll (100) comprises a first internally hollow shaft (110), which is coated by an insulating and/or refractory material and a plurality of wheels (25) connected in stably fixed manner to an outermost surface (111) of the first shaft (110) to handle and support the load (50). According to the invention, the roll (100) also comprises a second shaft (120) arranged within an inner cavity of the first shaft (110) in position coaxial to the first shaft (110) and so as to define a gap (30) between the first shaft (110) and said second shaft (120). The roll (100) further comprises cooling water cir-
(Continued)

culation means housed at least in part within said second shaft (120).

8 Claims, 7 Drawing Sheets

(51) Int. Cl.
*C03B 35/18* (2006.01)
*F27B 9/24* (2006.01)
*F27D 3/02* (2006.01)

(52) U.S. Cl.
CPC .......... *C03B 35/185* (2013.01); *C03B 35/186* (2013.01); *F27B 9/2407* (2013.01); *F27D 3/026* (2013.01)

(58) Field of Classification Search
USPC .................................................. 164/442, 448
See application file for complete search history.

(56) References Cited

U.S. PATENT DOCUMENTS

| | | | |
|---|---|---|---|
| 5,082,047 A * | 1/1992 | Bricmont | F27D 3/026 164/476 |
| 5,230,618 A | 7/1993 | Briemont et al. | |
| 5,338,280 A | 8/1994 | Morando | |
| 5,833,455 A | 11/1998 | Carr | |
| 2007/0180884 A1* | 8/2007 | Pankiw | F27B 9/2407 72/241.2 |

* cited by examiner

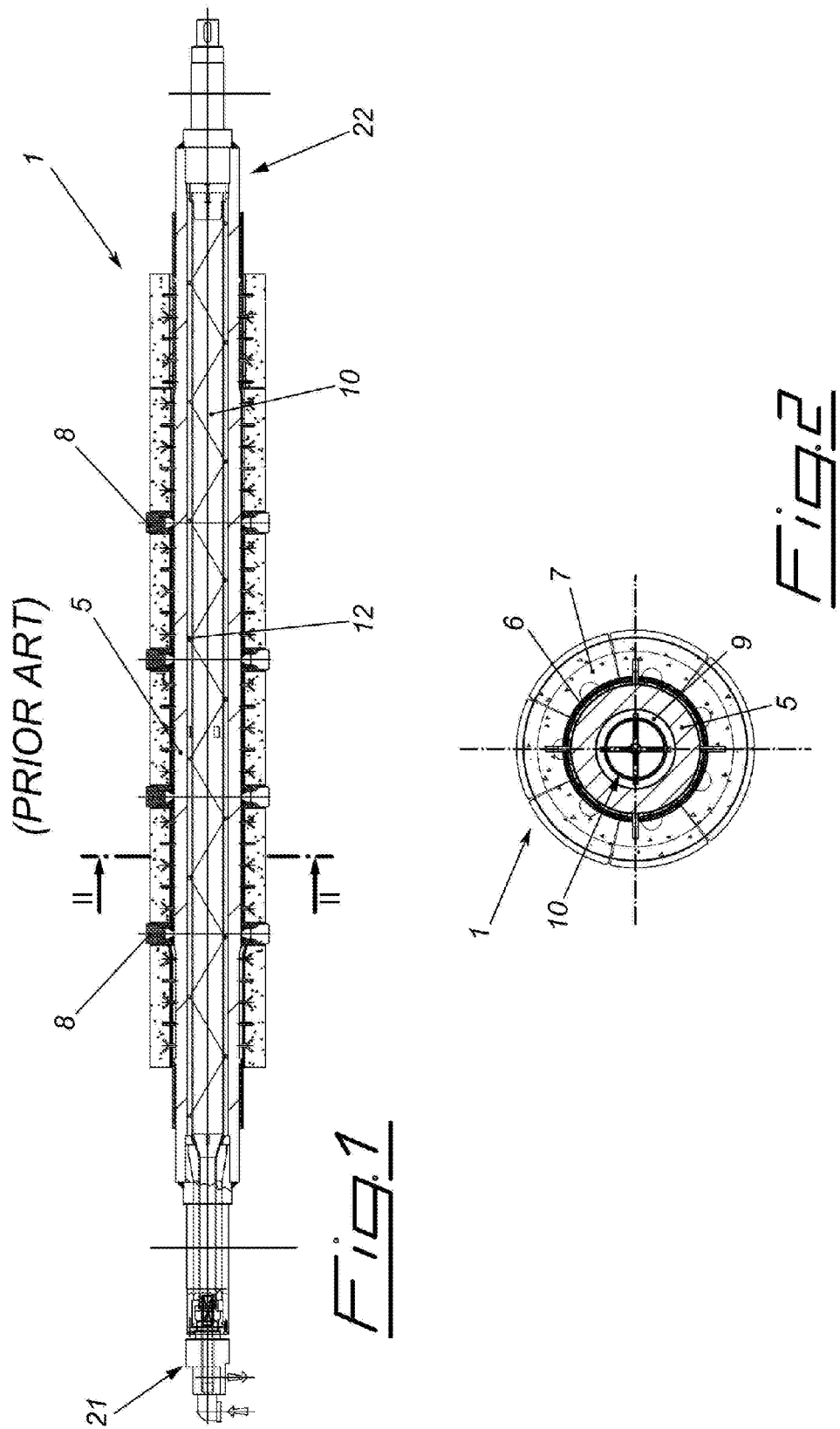

ROLL FOR HANDLING A LOAD IN A FURNACE USABLE IN A CONTINUOUS CASTING AND ROLLING PROCESS FOR THIN CARBON STEEL SLABS

CROSS REFERENCE TO RELATED APPLICATIONS

The present application claims priority to PCT International Application No. PCT/IB2015/053962 filed on May 27, 2015, which application claims priority to Italian Patent Application No. MI2014A000971 filed May 27, 2014, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to continuous casting and rolling processes (roughing and finishing) for thin carbon steel slabs. In particular, the invention relates to a handling roll usable in a furnace for temperature heating, maintaining and for buffering said thin slabs, following casting and upstream of rolling, in particular upstream of the roughing roll. The present invention also relates to a heating furnace comprising such a handling roll.

PRIOR ART

The use of heating furnaces is known in continuous casting processes, such as, for example, for thin slabs. These furnaces are arranged upstream of the rolling stands for heating the load (slabs) to a temperature adapted to allow this processing. In the case of thin slabs, for example, the rolling temperature usually varies between 1140 and 1150° C., and may reach 1240-1250° C.

There are other types of furnaces, according to the required application. A first type of furnace is that of the so-called "pusher furnaces". In this case, the load to be handled, i.e. the semifinished steel product, is arranged substantially on a floor and advanced through a pusher plant. In a variant thereof, the furnaces have a plurality of fixed hearths and a plurality of moveable hearths actuated by a mechanical hydraulic or electric actuating system. Alternatively to the fixed and moveable hearths, the variant with fixed and moveable supporting longitudinal members, actuated again by means of the same actuating system, may be used.

With respect to the aforesaid furnaces, the so-called "tunnel furnaces", also known as "roll furnaces", have been proven to be more advantageous for the applications related to the present patent application. In tunnel furnaces, the load is advanced by means of supporting and handling rolls arranged in series and so that their rotation axes are parallel to define a advancement direction orthogonal to the axes themselves. In the case of the production of thin slabs, these may have a length varying between 20 and 43 meters, a height varying between 45 and 110 mm and a width varying between 700 and 1800 mm Consequently, the tunnel furnaces used for the thin slabs are substantially "narrow and long" having an inner-chamber width varying between 2000 and 2200 mm and a length which may reach 250 meters.

In tunnel furnaces, each roll is actuated in manner independent from the others to allow an accurate control of the speed, and thus of the position, of the load. The advancement speed of the load in the furnace is adjusted as a function of the operating conditions of the entire plant usually by means of an incremental encoder and frequency converter (inverter). In other words, the operation of the furnace is not designed to be independent from the other parts of the production line but on the contrary is strongly dependent thereon.

Thus, with respect to the other aforesaid furnace types, tunnel furnaces may be used in plants having multiple casting lines and thus characterized by high productivity. A plant of this type may comprise, for example, a main line, a secondary line and at least two shuttles in order to take a load alternatively from either one or the other casting line to the rolling mill The rolls used in the tunnel furnaces have the function of supporting and moving the load and work in an atmosphere in which the temperature may reach up to 1180° C. The rolls are mounted on bearings, the distance of which may, in many cases, reach 3200 mm, i.e. a distance greater than the inner width of the furnace. Indeed, the bearings are normally arranged outside the furnace to preserve the lifespan thereof. The center distance between two consecutive rolls, i.e. the distance between the axes of the rolls measured along the advancement direction of the load usually varies between 1100 and 1300 mm These reference data clearly indicate that the rolls are subject to severe operating conditions in tunnel furnaces. Therefore, their structural configuration appears of primary importance for furnace operation, and in general for plant productivity.

Water-cooled rolls are the type of rolls most used in tunnel furnaces. With this regard, patent U.S. Pat. No. 5,230,618 and patent application US 2007180884 describe and illustrate examples of rolls of this type. With reference to FIGS. 1 and 2, in general a roll 1 (reference numeral 1 is used for such a water-cooled roll of the prior art, while a different reference numeral is used for the roll of the invention) comprises an internally hollow arbor 5, outside which a plurality of wheels 8 are welded, on which the load to be handled rests. The diameter of such wheels 8, also called supporting diameter, normally varies between 300 and 340 mm Such wheels 8 are usually made of high temperature resistant metal alloys containing materials such as for example chrome-nickel, tungsten and cobalt. Cooling water circulation means are housed in the inner cavity of the arbor 5. In most cases, such means comprise a circulation pipe 10 coaxial to the arbor 5 so as to define an annular gap 9 with the arbor itself. A rod 12 which is arranged in the annular gap 9 is wound as a spiral about the pipe 10. The coolant water enters at a first end 21 of the roll 1 and is conveyed into the pipe 10. At a second end 22 of the roll 1, the water is conveyed in opposite direction inside the annular gap 9 where it turns about the pipe 10 for the presence of the spiral-wound rod 12 to exit again from the roll 1 at the first end 21.

Again with reference to FIGS. 1 and 2, the arbor 5 is externally coated by at least a first layer 6 made of insulating material, and a second outermost layer 7 made of refractory material which has, in all cases, a diameter smaller than that of the supporting wheels 8. The purpose of such a second layer 7 is to protect the first layer 6 made of insulating material mainly against the erosion determined by the falling of scale (iron oxides) from the inner face of the load. The use of these coating layers 6, 7 has the purpose of limiting the thermal dispersion through the arbor 5.

A high thermal absorption by the roll 1 or, in other words, a high thermal dispersion through it, is noted upon the contact of the load with the wheels 8 and after the simultaneous cooling in water. Such a thermal dispersion derives from the rapid transfer of heat by conduction from the wheels to the inner surface of the arbor in which the water runs. From the thermal point of view, the load enters into the heating furnace at a temperature varying from 900° C. to 1100° C., as a function of the thickness of the slab and the casting speed, and exits at a temperature varying from 1000° C. to 1150° C. according to the evolution of the metallurgic microstructure in the furnace, with maximum values limited in general to 1180° C. In an ideal condition, i.e. in absence of thermal dispersions, it would be theoretically necessary to supply a thermal energy sufficient to guarantee the thermal head between inlet and outlet (approximately 300° C. max.). In actual fact, however, it is necessary to supply a much higher thermal energy precisely because of the thermal absorption/dispersion of the cooled rolls, much higher than the thermal dispersions into atmosphere through the furnace casing. The need to reduce the thermal dissipation phenomenon of the rolls while attempting to maintain the outer layers thereof at a temperature as close to that of the furnace as possible arises as a consequence. In this sense, the presence of an outer coating (layers 6 and 7) is fundamental. Indeed, in absence of these coating layers the thermal dispersion would make the process both economically and operatively unfeasible.

From the quantity point of view, it has been found that water-cooled rolls are subject to thermal dispersion which may reach even 28-35 kW, when the outer coating layer is intact. However, with this regard, it is worth noting that when the load is handled during the heating and temperature maintaining process, although resting on the wheels of the roll it determines cracks on the surface of the refractory material layer with the subsequent need for replacement or repairing. With this regard, the phenomenon is more frequent with the increase of the center distance between the rolls and increase of the thickness of the slab because the weight of the load increases and is released onto the single roll. The beginning of the deterioration process of the refractory material layer is inevitably accompanied by a gradual increase of thermal dispersion.

So-called dry rolls have been suggested, i.e. without water cooling, in order to decrease the thermal dispersion through the roll, and ultimately to limit the energy consumption of the plant. Examples of rolls of this type are illustrated in patent applications U.S. Pat. Nos. 5,338,280 and 5,833,455. In general, a "dry" roll comprises a cylindrical, internally hollow arbor made of special thermal-resistant alloys, i.e. materials capable of working at furnace chamber temperatures of approximately 1150° C. The drastic reduction of the thermal gap between the roll surface and the atmosphere of the furnace causes a thermal dispersion of 4-5 kW, thus considerably lower that which can be obtained with the cooled rolls evaluated with external coating.

The dry rolls have different drawbacks, the first of which is certainly the high cost determined by the use of the special alloys. Another drawback concerns the lifespan of these rolls, which is greatly and negatively bound to the operating temperature and consequently to the exit temperature of the slab from the furnace. Indeed, it has been observed that if the operating temperature is about 1180° C., the lifespan of such rolls is two times shorter than that found at temperatures close to 1150° C. Similarly, it has been found that the lifespan of dry rolls is also influenced by the size, i.e. the dimensions, of the load to be handled. In the case of thin slabs, e.g. it is found that the thickness of the slabs must be less than 80-90 mm in order to ensure an acceptable lifespan of the rolls. A drastic reduction of the mechanical strength properties, and thus of the functionality of the rolls, is found at greater thicknesses.

It is thus apparent that tunnel furnaces with water-cooled rolls are much more versatile from the production point of view because they are less constrained to operating temperatures and load dimensions. Furthermore, it is worth noting that in the case of water-cooled rolls, the outer coating may be regenerated to restore functionality of the roll itself. On the contrary, dry type rolls cannot be regenerated and must be replaced with other new rolls at the end of their use. In terms of costs, replacing a series of dry type rolls is much more disadvantageous than regenerating a same number of water-cooled rolls.

Given the considerations above, the need thus arises to improve the behavior of water-cooled rolls because, ultimately, the low production versatility of dry type rolls does not completely justify the great economic investment. In this sense, a possible suggested solution, which is however difficult to implement, is to optimize the outer coating, e.g. by replacing the layer of refractory material with more insulating material, such as ceramic fiber. However, the latter has a very short lifespan at furnace operating temperatures. This is mostly due to the scale lost by the load during the transit through the furnace. Such an oxide rapidly deteriorates the ceramic fiber. The latter also displays problems of toxicity (related to the bio-persistence of the fibers), and thus the disposal during possible coating restoring activities requires expensive equipment and operative procedures.

In order to solve these drawbacks, a logical solution could be to use ecological fibers, which, in all cases, require excessively low operating temperatures and have problems of permanent shrinkage by volume.

According to another approach, document WO 02/34026 describes a roll provided with two coaxial shafts, and in particular with an outer shaft which is proximal to the slab and an inner shaft which is water-cooled. Multiple spacers, which define air gaps, are provided between the two shafts. The purpose of such gaps is to attempt to reduce the thermal exchange between the two shafts. However, the two shafts are, in actual fact, always in mutual contact in multiple points, independently from the loading conditions and the portion of the roll which is proximal to the slab during the rotation of the roll itself. Indeed, the roll is constructed so that the spacers are always in contact with both shafts. This is a marked limit because a thermal bridge is present between the two shafts, which considerably contributes to the undesired cooling of the slab, and in particular to the heat draining from the furnace environment with consequent negative repercussions on gas consumption. A further disadvantage of such a solution is that the spacers are made of refractory material. The main limits are that they are expensive materials and are not very wear-resistant so they must be frequently replaced.

SUMMARY

It is the task of the present invention to provide a roll for handling a load in a heating furnace which allows to overcome the drawbacks of the prior art described above. In this task, it is a first object of the present invention to provide a water-cooled handling roll having a more limited thermal dispersion than that of traditional rolls. It is another object of the present invention to limit the thermal dispersion through the roll without intervening on the outer coating of the roll itself. It is yet another object of the present invention to provide a water-cooled handling roll which is reliable and easy to make at competitive costs.

This task and these objects are achieved by means of a water-cooled handling roll for handling a load, in particular a thin slab, in a furnace for temperature heating and maintaining usable in continuous casting line, wherein said roll comprises:

- a first internally hollow shaft, which longitudinally runs around a first longitudinal axis, such a first shaft comprising an outermost surface and an innermost surface, wherein said outermost surface is coated by an insulating and/or refractory material, and wherein said innermost surface defines an inner cavity of said first shaft;
- a plurality of wheels for supporting said load, wherein such wheels are stably fixed to the outermost surface of the first shaft;
- a second shaft arranged within the inner cavity of the first shaft in a position coaxial to the first shaft, wherein such a second shaft has an outermost surface which has, for at least a first longitudinal length, a smaller diameter than the diameter of the inner cavity of the first shaft so as to define a gap between the two shafts of the roll;
- centering rings arranged inside said gap and stably integral with said second shaft, said centering rings having a diameter smaller than said diameter of said inner cavity of said first shaft;
- cooling water circulation means housed at least in part within the second shaft.

With respect to the traditional solutions, in the roll according to the present invention, thermal dispersion may be advantageously smaller by effect of the presence of a gap (i.e. an empty space) between the outermost shaft (first shaft) and the innermost shaft (second shaft) arranged inside the cavity defined by the outermost shaft. This gap is indeed an insulating barrier through which the heat may only be radiated and may be transmitted by convection from the outermost shaft to the innermost shaft. With the process of thermal transmission between the two shafts lacking, the outermost shaft maintains a temperature closer to the operating temperature of the furnace and thus thermal dispersion is advantageously reduced.

Unlike the known solutions, in which thermal dispersion was faced by attempting to optimize the outer coating materials, in the case of the present invention this problem is solved by varying the thermal energy transfer principle to the cooling water, i.e. by varying the innermost structure of the roll.

An advantageous feature of the invention is that the diameter of each centering ring, from the longitudinal axis to their outermost surface, is smaller than the outer diameter of the air gap, i.e. than the diameter of the inner cavity, where the latter diameter spans from the longitudinal axis to the inner surface of the first shaft. Thus, the radially outermost surface of the centering rings is not in contact with the inner surface of the first shaft, unless high load conditions are present.

By virtue of the centering rings which act as spacers, the contact between the outermost shaft and the inner shaft occurs only in high operating temperature conditions at the passage of a relatively heavy slab which causes the bending of the outer shaft. In particular, the contact occurs between a relatively small portion of the outer shaft and portion of the centering ring, not occurring on the entire circumference of the centering ring. Furthermore, considering that the roll is turning, the possible contact zone between outer shaft and inner shaft (by means of the centering rings) varies over time, so that the time window in which an undesired thermal exchange could occur, is limited. In this manner, the number of thermal bridges between the two shafts are minimized According to an embodiment, the centering rings are made of carbon or construction steel, which may be the same as that of the inner shaft. Preferably, the centering rings are obtained by processing the inner shaft, thus forming a single part with the latter, having a constructive simplicity higher than the prior art. The centering rings made of steel, in addition to containing costs, are particularly wear-resistant without having a sudden variation of conductivity which occurs instead if two different materials are used for the two elements.

The invention also provides that the centering rings are not aligned with the wheels, thus contributing to greatly containing the thermal dispersion caused by thermal bridges which are generated by contact between the outer shaft and each of the centering rings following the bending induced by the weight of the slab.

A further advantage of the invention is that the outer shaft is coated with insulating and/or refractory material so that it is the refractory material to be exposed to the environment of the furnace, with the consequent positive effects on the working life of the roll and on the thermal draining from the furnace environment, the operative conditions being equal.

BRIEF DESCRIPTION OF THE FIGURES

Further features and advantages of the present invention will be apparent in light of the detailed description of a preferred but not exclusive embodiments of a water-cooled handling roll illustrated by way of non-limitative examples, with the help of the accompanying drawings, in which:

FIG. 1 is a section view of a handling roll of known type;
FIG. 2 is a view taken along section line II-II in FIG. 1.

The same reference numbers and letters in the figures refer to the same elements or components.

DETAILED DESCRIPTION OF THE INVENTION

Figure 3:
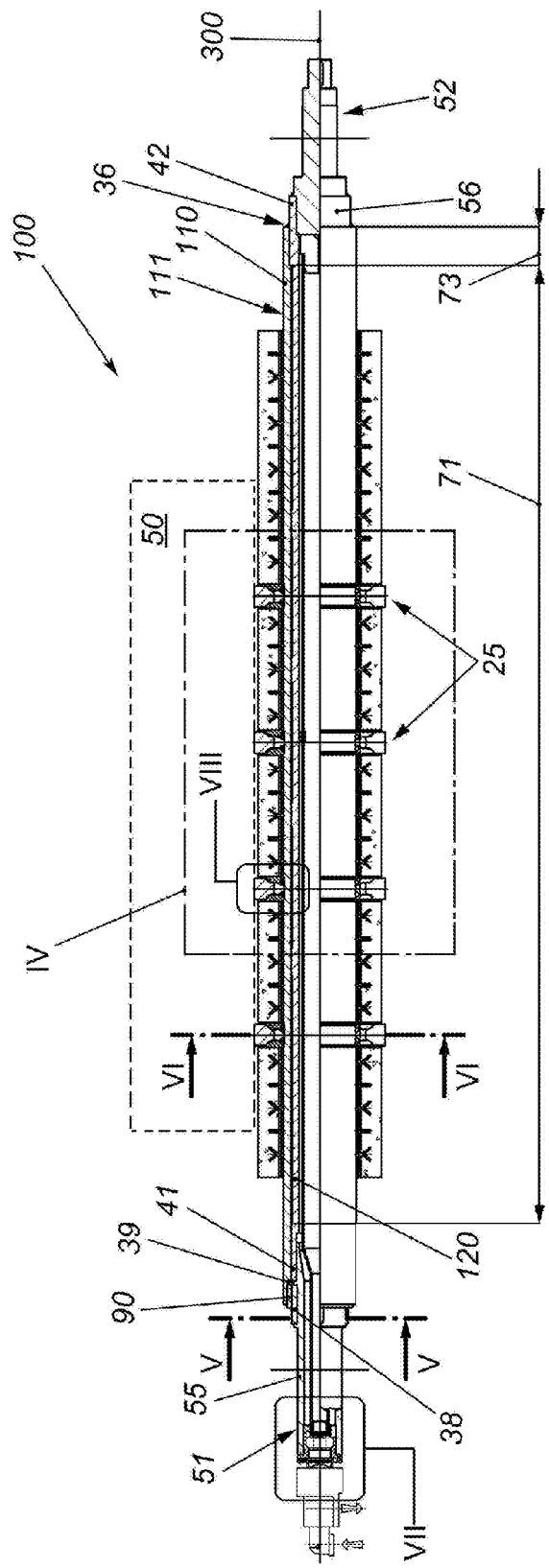
FIG. 3 is a section view of a handling roll according to the present invention.

With reference to the mentioned figures, the present invention relates to a water-cooled handling roll 100 usable in a furnace for temperature heating and maintaining of a continuous casting line, preferably but not exclusively for the production of thin slabs. The roll 100 comprises an outer table defined by a first internally hollow shaft 110 (hereinafter indicated also as "outermost shaft 110") which runs about a longitudinal reference axis 300.

Hereinafter, in this description, the expression "outer table 110" is also used instead of the expression "first shaft 110". The two expressions are equivalent for the purposes of the present invention.

The outer table 110 comprises an outermost surface 111 and an innermost surface 115, which defines an inner cavity of said outer table 110. The first shaft 110 is preferably made of a high temperature resistant steel alloy, i.e. resistant to temperatures also higher than 1000° C.

Figure 6:
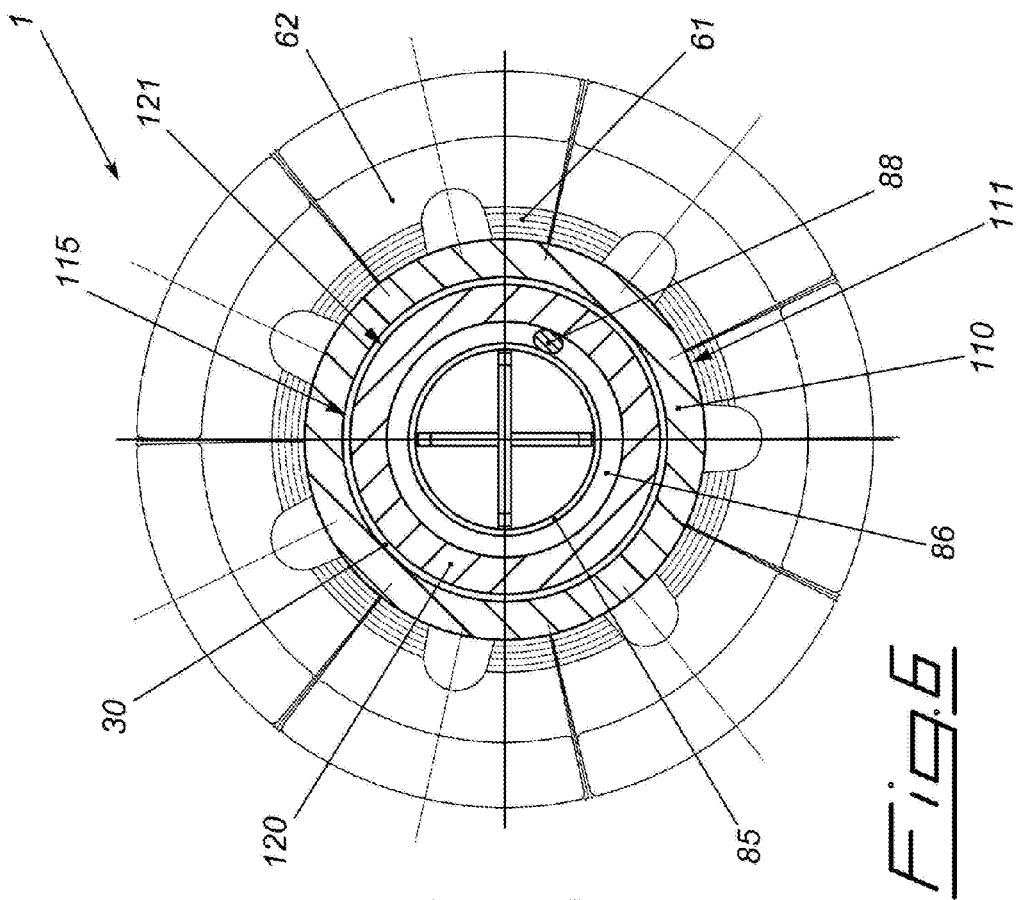
FIG. 6 is a section view taken along line VI-VI in FIG. 3.

The outermost surface 111 of the first shaft 110 is coated with insulating and/or refractory material. With reference to the section view in FIG. 6, a multilayer coating is preferably provided comprising at least one first layer 61 of insulating material coating in contact with the outer surface 111 of the first shaft 110. Microporous material or ceramic fiber can be used for this purpose. The multilayer coating further comprises at least one second layer 62 of dense refractory material, reinforced with metallic anchors welded to the outermost surface 111, and placed externally to the first layer 61.

Figure 8:
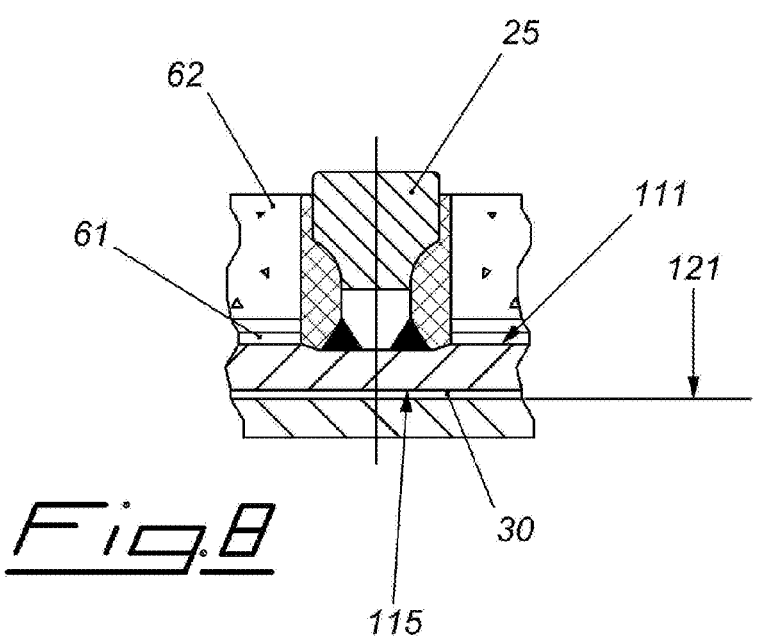
FIG. 8 is an enlargement of detail VIII indicated in FIG. 3.

The roll 100 further comprises supporting wheels 25 which operatively support the load 50, diagrammatically illustrated by a dashed line in FIG. 3. Hereinafter, for descriptive purposes only, a "thin slab" will be considered as the load 50. However, in the scope of the present invention the type of load 50 could be different. With reference to the detail view in FIG. 8, the wheels 25 are made of high temperature resistant metallic alloys and are welded to the outermost surface 111 of the outer table 110. In the illustrated example in FIG. 3, there are provided four supporting wheels 25 distanced along a direction parallel to the longitudinal axis 300. The wheels 25 emerge with respect to the coating layers 61, 62 arranged about the outermost surface 111 of the first shaft 110.

The roll 100 according to present invention further comprises a second shaft 120 (hereinafter also indicated by the expression "innermost shaft 120") arranged inside the inner cavity of the first shaft 110 (outer table) in position coaxial to the first shaft 110 itself. For the purposes of the present invention, the "coaxial position" is evaluated in a condition without load 50. The first shaft 110 and the second shaft 120 thus both run ideally about the same longitudinal axis 300. The latter coincides substantially with the rotation axis of the handling roll 100.

The second shaft 120 is preferably made of a construction steel and is internally configured to house water circulation means. By way of example, such means may comprise a circulation pipe 85 inserted in the second longitudinal cavity in position coaxial to the second shaft 120 according to a principle known in itself. Such a pipe 85 has an outer diameter 81 smaller than the inner diameter of the longitudinal cavity of the second shaft 120 so as to define an annular passage 86 intended to be crossed by cooling water. In order to confer a swirl motion to the cooling water about the pipe 85 itself, a metal rod or plate 88 spiral-wound about the outermost surface of the pipe 85 can be arranged inside said annular passage 86.

The second shaft 120 thus comprises an outermost surface 121 facing the innermost surface 115 of the first shaft 110 i.e. the outer table. According to the present invention, the value of the diameter of the outermost surface 121 of the second shaft 120 is smaller than the value of the diameter of the innermost surface 115 of the first shaft 110 for at least one first longitudinal length 71 so that a gap 30, i.e. an empty space, is defined between said second shaft 120 and said first shaft 110. As a result, the two shafts 110, 120 are not in contact for the entire extension of the first longitudinal length 71, at least in absence of the load 50. The presence of this gap 30 allows to obtain a strong reduction of the thermal reduction through the roll 100. Indeed, the transfer of thermal energy from the first shaft 110 to the second shaft 120 may occur only by radiation and convection for the length of the first longitudinal length 71.

As shown in greater detail below, during the normal operation of the roll 100, the outer table 110 is subject to bending/curving by effect of its weight and the load 50. According to the value of the radial extension of the gap 30, the inner surface 115 of the outer table 110 could thus come into contact with the outer surface 78 of the centering rings 77, but only if the weight of the load is relatively high. However, such a possible contact would occur along a generating line of the innermost cylindrical surface 115 of the outer table 110. In other words, the contact would occur substantially along a relatively small arc of circumference. Furthermore, considering that the roll is turning, the possible contact zone between the first shaft 110 and the second shaft 120 varies over time so that the time window in which a thermal exchange could occur is limited. Therefore, the possible thermal transmission by conduction between the two surfaces (115 and 121) would be negligible with respect to the advantages which can be achieved by effect of the gap 30.

According to a preferred embodiment, the innermost surface 115 of the first shaft 110 has a cylindrical configuration with a substantially constant diameter for the entire first longitudinal length 71. The gap 30 defined between the two shafts 110, 120 has a radial extension preferably comprised in a range between 2 mm and 10 mm The expression "radial extension" indicates the extension of the gap 30 measured along a direction laying on a plane orthogonal to the longitudinal axis 300 in common to the two shafts 110, 120 and containing the same axis.

Figure 4:
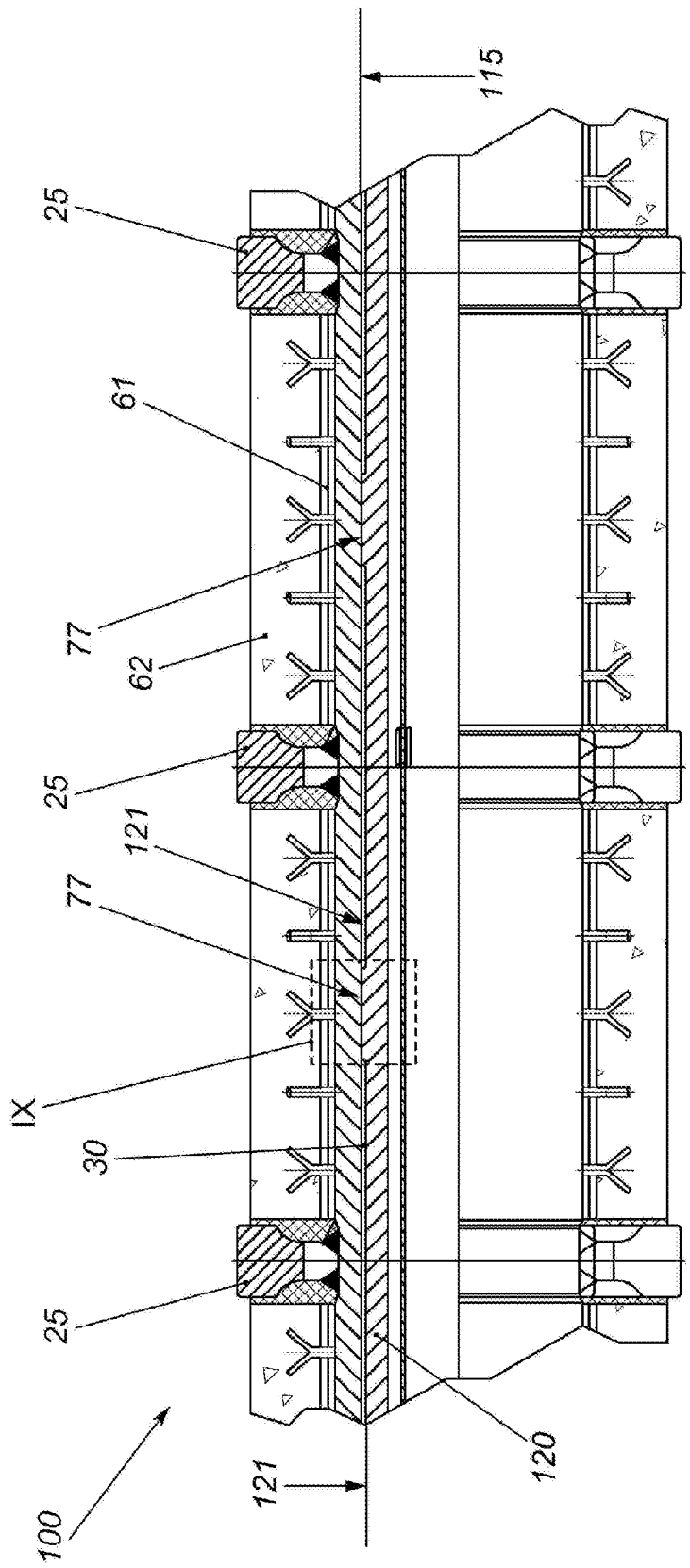
FIG. 4 is an enlargement of the detail IV indicated in FIG. 3.

With particular reference to FIG. 4, the roll 100 according to the invention comprises centering rings 77, which are shaped as protrusions which from the second shaft 120 extend radially towards the first shaft 110. The centering rings 77 are operatively arranged inside the gap 30 and stably connected to the outermost surface 121 of the second shaft 120. Such rings 77 have the function of containing the bending of the outer table 110 which is generated during the use of the roll 100 in a heating furnace. Indeed, as previously described, when a thin slab 50 rests on the wheels 25 of the roll 100, the outer table 110 is subject to a bending stress and thus to a deformation which translates into a lack of coaxiality between the outer table 110 and the second shaft 120. Advantageously, the rings 77 allow to limit such a deformation.

Preferably, the centering rings 77 are not aligned with the wheels 25. For example, as shown in particular in the view in the detail in FIG. 4, the longitudinal position of such rings 77 is offset with respect to the longitudinal position of the wheels 25. This solution allows to greatly contain the thermal dispersion due to the thermal bridges which are generated by the contact between the outer table 110 and each of the rings 77 due to the bending induced by the weight of the thin slab 50. Indeed, the supporting wheels 25 constitute the parts of the roll 100 at higher temperature by effect of the contact with the thin slab 50 and with the atmosphere of the furnace chamber. By offsetting the position of the rings 77 with respect to the wheels 25, the rings themselves come into contact with portions of the innermost surface 115 of the first shaft 110, the temperatures of which portions are lower than the temperatures underneath the wheels 25, the temperatures of which are higher. Preferably, each centering ring is in a longitudinal position which is approximately half way between two adjacent supporting wheels.

Figure 9:
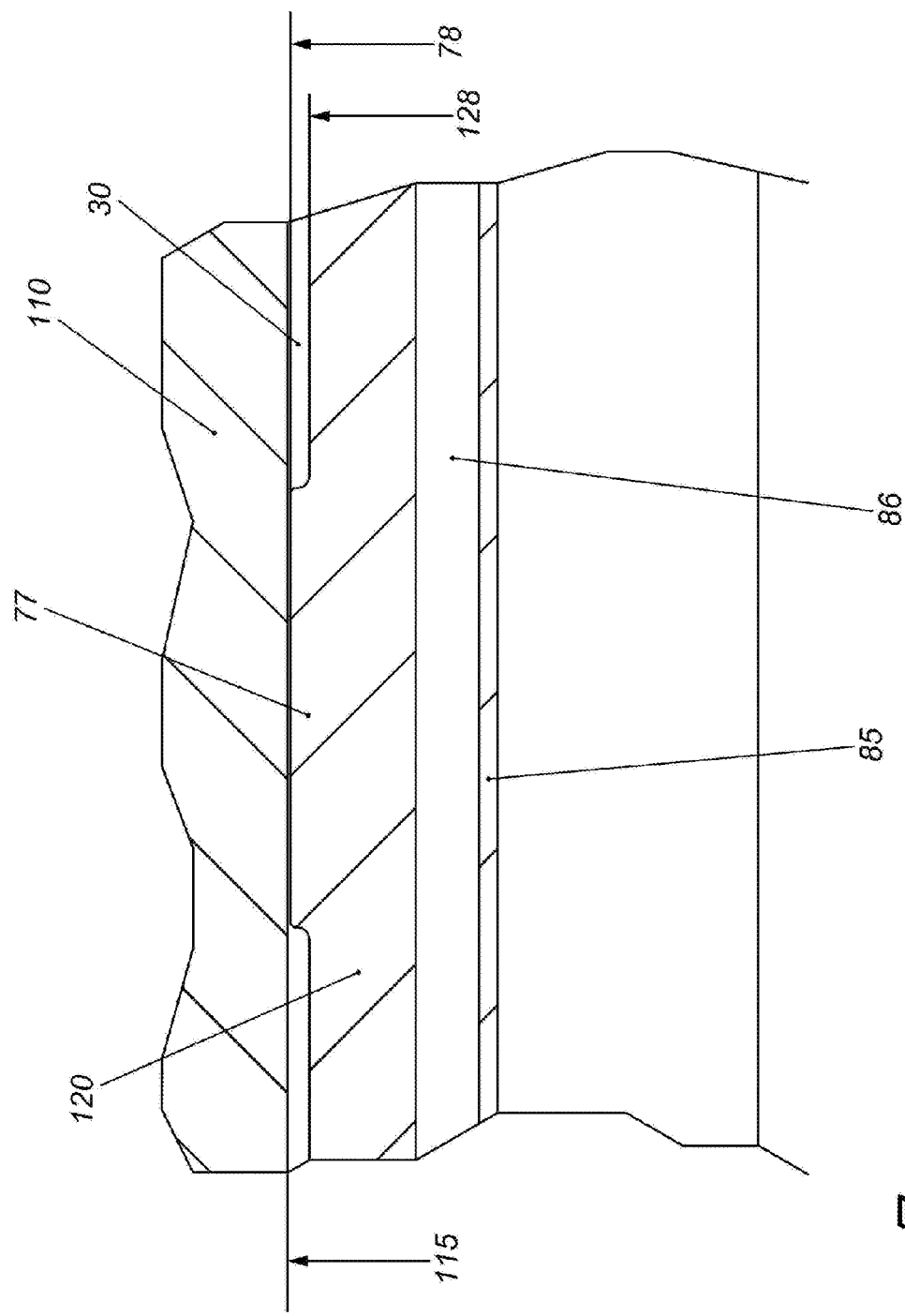
FIG. 9 is an enlargement of detail IX of FIG. 4.

FIG. 9 is a detail view which allows to observe a preferred embodiment of the invention according to which the rings 77 are made in one piece with the second shaft 120 emerging in the gap 30 as an enlarged position of the second shaft 120 itself having a diameter (identified by reference numeral 78) greater than a nominal diameter (indicated by reference numeral 128) of the outermost surface 121 of the second shaft 120. The detailed view of FIG. 9 shows two shafts 110, 120 of the roll 100 and a centering ring 77 in a condition without load 50. It is worth noting that the diameter of the outermost surface (indicated by reference numeral 78) of the ring 77 is lower than the nominal diameter of the innermost surface 115 of the first shaft 110 so as to maintain, in all cases, a separation gap (space) between the two shafts 110, 120 also at the ring 77, which is a "localized enlargement" of the second shaft 120.

Figure 10:
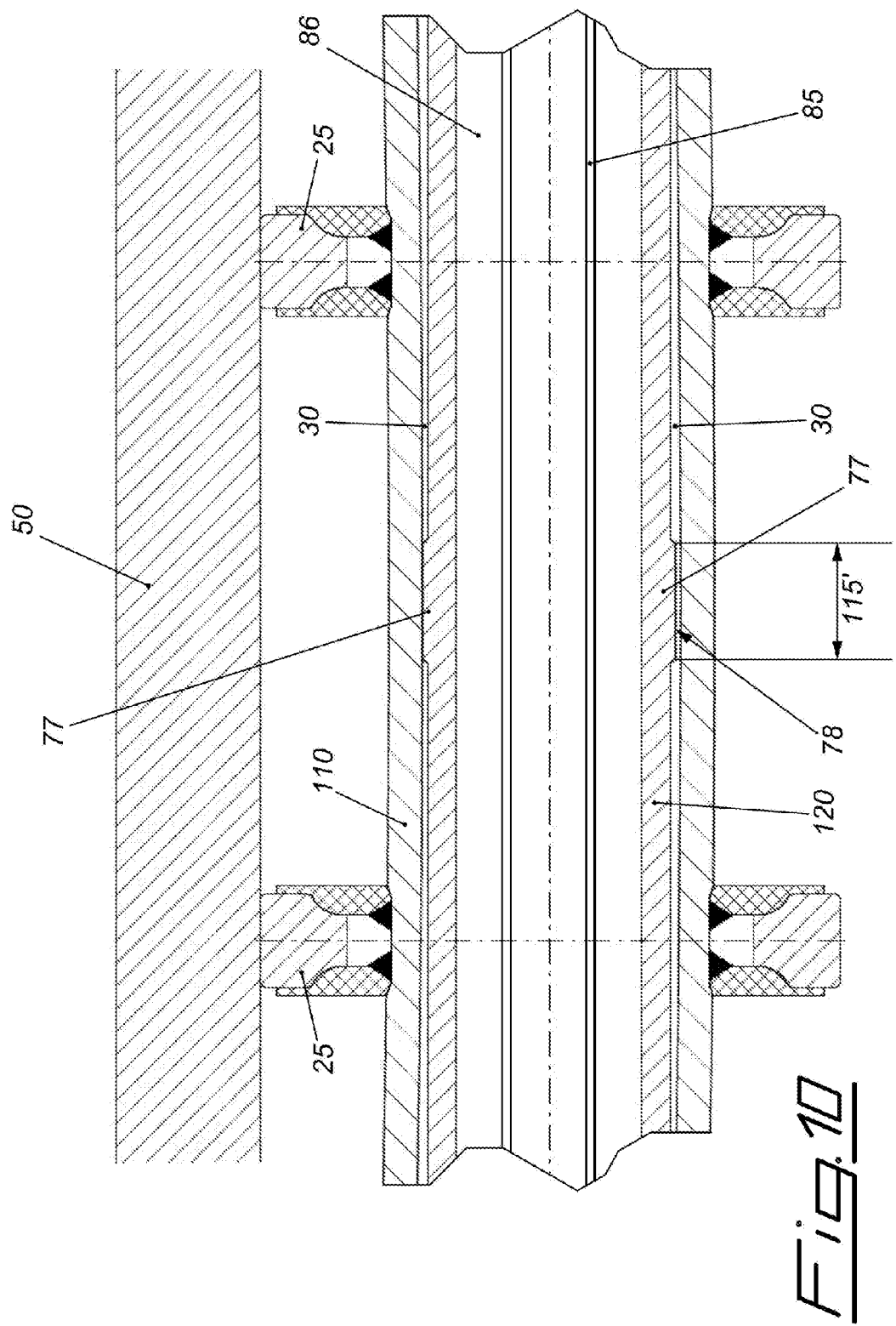
FIG. 10 is a diagrammatic view of a portion of a roll according to a possible embodiment of the invention.

FIG. 10 is a diagrammatic view the purpose of which is to demonstrate the function of the centering rings 77 during the normal operation of the roll 100. In particular, this further figure shows a centering ring 77 made in one piece with the second shaft 120, but the considerations which follow are valid also in the case of a ring made separately from the second shaft 120 and only later connected thereto. During the operation of the roll 100 the load 50 resting on the wheels 25 may determine a bending/curving of the outer table 110 such that a first portion of the innermost surface 115 of the outer surface 110 rests on the outer surface 78 of the ring 77. At the same time, it is worth noting that a second portion (indicated by reference numeral 115') of the innermost surface 115, is instead detached from the outer surface 78 of the ring 77. The detachment occurs substantially by virtue of the elastic return of the outer table 110 during the rotation of the roll about its axis. Such a second portion 115' is typically greater than the first portion and only the part diametrically opposite to the first portion is shown in FIG. 10. Thus, the centering rings 77 have the function of containing the bending/curving of the outer table 110 thus providing a resting surface to it. The latter is however limited because the contact occurs in fact usually only in relatively high load conditions and only along a generating line, and thus a relatively small portion, of the innermost cylindrical surface 115 of the outer table 110. Consequently, the thermal exchange by conduction between such an innermost surface 115 and the outermost surface 78 of the ring 77 is extremely small. Substantially, the rings 77 contrast the deformation of the outer table 110 without however limiting the effects of the gap 30 which can be achieved in terms of thermal insulation.

Figure 7:
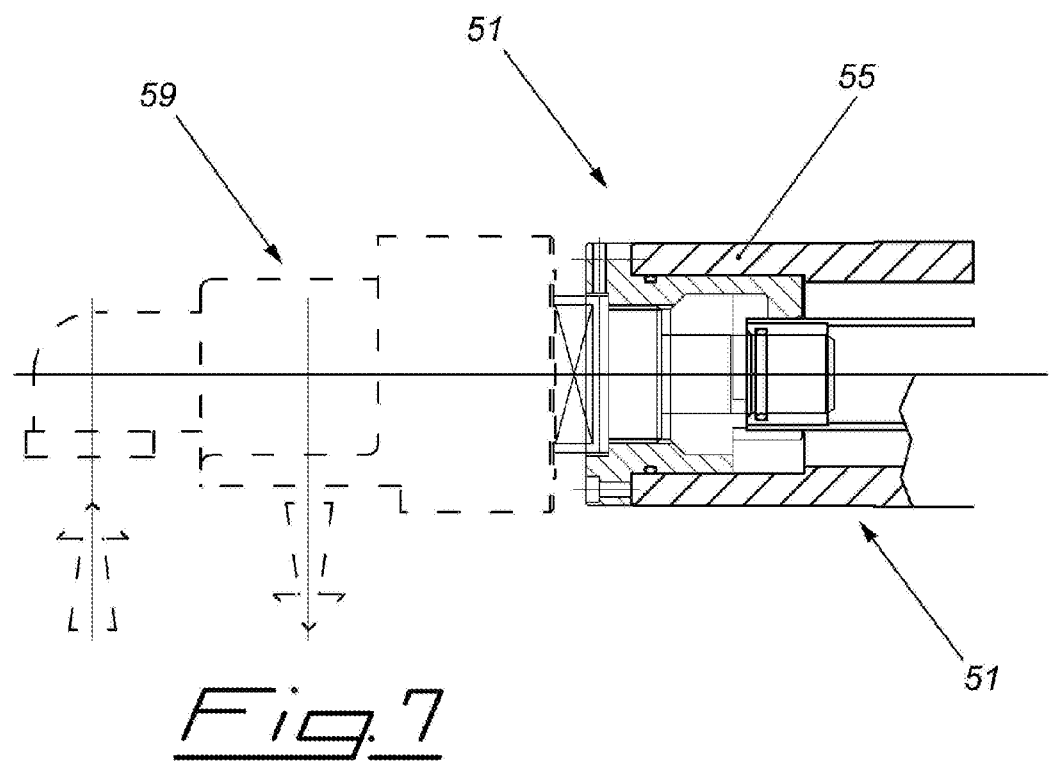
FIG. 7 is an enlargement of detail VII indicated in FIG. 3.

Again with reference to FIG. 3, the roll 100 comprises a first end portion 51 and a second end portion 52 which define a first support and a second support for the roll itself, respectively. The distance between such supports can be greater than the inner width of the furnace in which the roll 100 is intended to be used. With reference to the detailed view in FIG. 7, the first end portion 51 is defined by a cylindrical body 55 connected by a first end to a second end 41 of the second body 120 of the roll 100 (by means of a welding 39, as described in greater detail below). A second side 55 of the cylindrical body 55, opposite to the first, is instead closed by a hydraulic device 59 (known in itself) for letting in and out the cooling water intended to circulate inside the second shaft 120 of the roll 100.

The second end 52 of the roll 100 comprises a further body 56 welded to a second end 42 of the second shaft 120 opposite to the end 41 indicated above. In addition to defining said second support for the roll 100, such a body 56 also has the function of reversing the motion of the cooling water circulating in the second shaft 120. With this regard, again according to a solution known in itself, the water is forced to cross the inner pipe 85 by means of the hydraulic device 59. At the end of the crossing of such inner pipe 85, by effect of the body 56 arranged at the second end 52, the water is conveyed in the annular passage 86 between the pipe 85 and the innermost surface of the second shaft 120 towards an outlet defined by the hydraulic device 59 itself.

Figure 5:
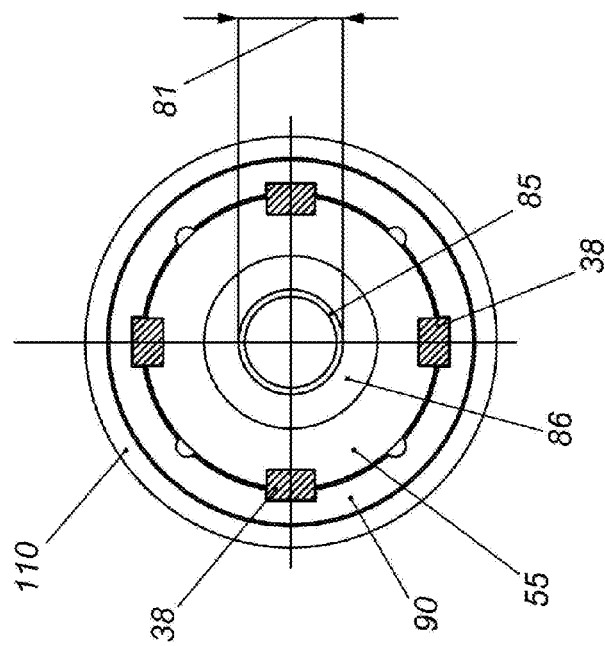
FIG. 5 is a section view taken along line V-V in FIG. 3.

With particular reference to FIGS. 3 and 5, according to a possible embodiment, the outer table 110 is welded to a hub 90 (visible in the section view in FIG. 5), which is connected to the first end portion 51 of the roll 100 by means of motion transmission means 38, which can be tongues or cotters. The second shaft 120 is stably connected at an edge to the cylindrical body 55 of the first end portion 51 through a welding 39, which is consequently in a more inner position with respect to the motion transmission means 38.

Again according to a preferred embodiment, for at least one second longitudinal length 73, the innermost surface 115 of the outer table 110 and the outermost surface 121 of the second shaft 120 have substantially the same nominal diameter. Such a second length 73 is identified near the second end 42 of the second shaft 120. In addition to this relationship between the diameters, it is worth noting that the terminal edge of the outer table 110 is stably fixed to the second shaft 120 at such a second end 42 through a further welding 36.

So, on the basis of the description above, it is worth noting that in the embodiment shown in the figures, the roll thus comprises connection means 90, 36, 38, 39 between the first shaft 110 (outer table 110) and the second shaft 120 which stably fix the two shafts 110, 120 so as to allow a synchronous rotation thereof about a rotation axis coinciding with the longitudinal axis 300 about which the two shafts 110, 120 are developed.

It is particularly advantageous to provide the welding 36 between the outer table 110 and the inner table 120 at an end of the roll, while at the other end there is a sort of revolver drum provided by the motion transmission means 38. Indeed, the latter allows the coupling between outer table 110 and inner table 120, however guaranteeing the expansion of the hot outer table with respect to the cold inner shaft. This solution allows to avoid the use of further components, such as spacer tubes, so as to supply a greater construction simplicity.

The present invention also relates to a furnace for temperature heating, maintaining and for buffering in continuous casting and rolling processes for carbon steel thin slabs. The furnace according to the invention is arranged in an intermediate position between the continuous cast and the roughing roll and is characterized in that it comprises at least one handling roll 100 as described above.

The invention claimed is:
1. A water-cooled handling roll for handling a load, in particular a thin slab, in a furnace for heating, temperature maintaining and for buffering of said load in a continuous casting and rolling process, wherein said water-cooled handling roll comprises:
a first shaft internally hollow, which longitudinally runs around a first longitudinal axis, said first shaft comprising an outermost surface and an innermost surface, wherein said outermost surface of said first shaft is coated by an insulating and/or refractory material, and wherein said innermost surface of said first shaft defines an inner cavity of said first shaft;

a plurality of supporting wheels for supporting said load, said supporting wheels being stably fixed to said outermost surface of said first shaft;

a second shaft arranged within said inner cavity of said first shaft in a position coaxial to said first shaft, an outermost surface of said second shaft having, over at least a first longitudinal length, a smaller diameter than the diameter of said inner cavity of said first shaft so as to define a gap between said first shaft and said second shaft, centering rings arranged inside said gap and stably integral with said second shaft, said centering rings having a diameter smaller than said diameter of said inner cavity of said first shaft;

cooling water circulation means housed at least in part within said second shaft.

2. A water-cooled handling roll according to claim 1, wherein said centering rings are made in one piece with said second shaft.

3. A water-cooled handling roll according to claim 1, wherein said second shaft is made of construction steel.

4. A water-cooled handling roll according to claim 1, wherein a longitudinal position of said centering rings is offset with respect to a longitudinal position of said supporting wheels.

5. A water-cooled handling roll according to claim 1, wherein said second shaft is internally hollow comprising a longitudinal cavity within which said cooling water circulation means are arranged.

6. A water-cooled handling roll according to claim 1, wherein said first shaft is made of a steel alloy capable of withstanding temperatures higher than 1000 degrees.

7. A water-cooled handling roll according to claim 1, wherein said centering rings are made of a material having a lower thermal conductivity than that of said first shaft and/or of said second shaft.

8. A furnace for heating, temperature maintaining and for buffering, arrangeable between a continuous cast and a roughing roll in a continuous casting and rolling process for casting carbon steel thin slabs, characterized in that it comprises at least one water-cooled handling roll according to claim 1.

* * * * *